US012703199B2

United States Patent

Fazzini et al.

(10) Patent No.: US 12,703,199 B2

(45) Date of Patent: Aug. 11, 2026

(54) METHOD OF MANUFACTURING PANELS AND PANELS MANUFACTURED ACCORDING TO SAME

(71) Applicant: Armstrong World Industries, Inc., Lancaster, PA (US)

(72) Inventors: Anna Fazzini, Columbia, PA (US); Robert Duschl, Lititz, PA (US); Steven Masia, Lancaster, PA (US); Marie Depaul, Downingtown, PA (US); Zachary Dozier, Lancaster, PA (US)

(73) Assignee: AWI Licensing LLC, Wilmington, DE (US)

(*) Notice: Subject to any disclaimer, the term of this patent is extended or adjusted under 35 U.S.C. 154(b) by 0 days.

(21) Appl. No.: 18/897,445

(22) Filed: Sep. 26, 2024

(65) Prior Publication Data

US 2026/0084461 A1 Mar. 26, 2026

Related U.S. Application Data

(60) Provisional application No. 63/535,242, filed on Aug. 29, 2023.

(51) Int. Cl.

| | |
|---|---|
| ***B32B 3/10*** | (2006.01) |
| ***B44F 9/02*** | (2006.01) |
| ***E04B 2/72*** | (2006.01) |

(52) U.S. Cl.

CPC . *B44F 9/02* (2013.01); *E04B 2/72* (2013.01)

(58) Field of Classification Search

None

See application file for complete search history.

(56) References Cited

U.S. PATENT DOCUMENTS

2018/0264789 A1* 9/2018 Whitesell, Jr. .......... B32B 37/10
2022/0177710 A1* 6/2022 Smith .................... C09D 5/028
2022/0379654 A1* 12/2022 Masia ....................... B44C 5/04

FOREIGN PATENT DOCUMENTS

BR 112014032257 B1 * 1/2021 ............... E04B 1/84

OTHER PUBLICATIONS

Machine translation of BR-112014032257-B1 (Year: 2021).*

* cited by examiner

*Primary Examiner* — Christopher M Polley

(74) *Attorney, Agent, or Firm* — Patrick Sheldrake

(57) ABSTRACT

Described herein is a method of manufacturing a panel for a building wherein a wood-grain image is printed on a scrim, the scrim is joined to a panel body, and an edge portion of the panel body is coated. Panels manufactured according to this method may incorporate a variety of different wood-grain images, allowing an aesthetic appearance which matches the rest of the room in which the panel is installed. The image may be located on a printed layer which is on top of or penetrates into the scrim.

20 Claims, 7 Drawing Sheets

METHOD OF MANUFACTURING PANELS AND PANELS MANUFACTURED ACCORDING TO SAME

CROSS-REFERENCE TO RELATED APPLICATIONS

The present application claims the benefit of priority to U.S. Provisional Patent Application Ser. No. 63/535,242 filed Aug. 29, 2023, the entirety of which is incorporated herein by reference.

BACKGROUND

Panels are frequently used in various building applications such as wall and ceiling panels. Such panels are frequently manufactured and coated or otherwise painted to give an appealing aesthetic appearance. Both edges and major surfaces of panels are frequently coated, but the coating process is often limited to a single color without any particular image or pattern. Improved panel aesthetics are required which allow these panels to blend in with other aspects of the building. Therefore, a need exists for improved panels and associated manufacturing methods to enable improved aesthetics with increased variety of panel appearance.

BRIEF SUMMARY

Described herein is a method of manufacturing a panel. The method involves a first step of printing an image on a first major surface of a scrim with a printer, the scrim having a second major surface opposite the first major surface of the scrim. Second, the second major surface of the scrim is attached to a first major surface of a panel body to form a panel subassembly, the panel body having a second major surface opposite the first major surface of the panel body and an edge portion extending between the first and second major surface of the panel body. Third, a coating composition is sprayed onto the edge portion of the panel body to form a coating on the edge portion.

Other embodiments of the present invention include a panel, the panel having an acoustic panel body, a filled scrim, a printed layer, and a high solids paint coating. The panel body has an acoustic panel body having a first major surface, a second major surface opposite the first major surface, and an edge portion extending between the first and second major surfaces. The filled scrim has a first major surface and a second major surface opposite the first major surface of the scrim, the second major surface of the filled scrim coupled to the first major surface of the acoustic panel body. The printed layer is on the first major surface of the filled scrim. The high solids paint coating on the edge portion of the acoustic panel body.

In yet other embodiments of the present invention, the invention may be a building panel. The building panel has a panel body, a filled scrim, and a printed layer. The panel body has a first major surface, a second major surface opposite the first major surface, and an edge portion extending between the first and second major surfaces. The filled scrim having a first major surface and a second major surface opposite the first major surface of the filled scrim, the second major surface of the filled scrim coupled to the first major surface of the acoustic panel body. The printed layer is on the first major surface of the filled scrim.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
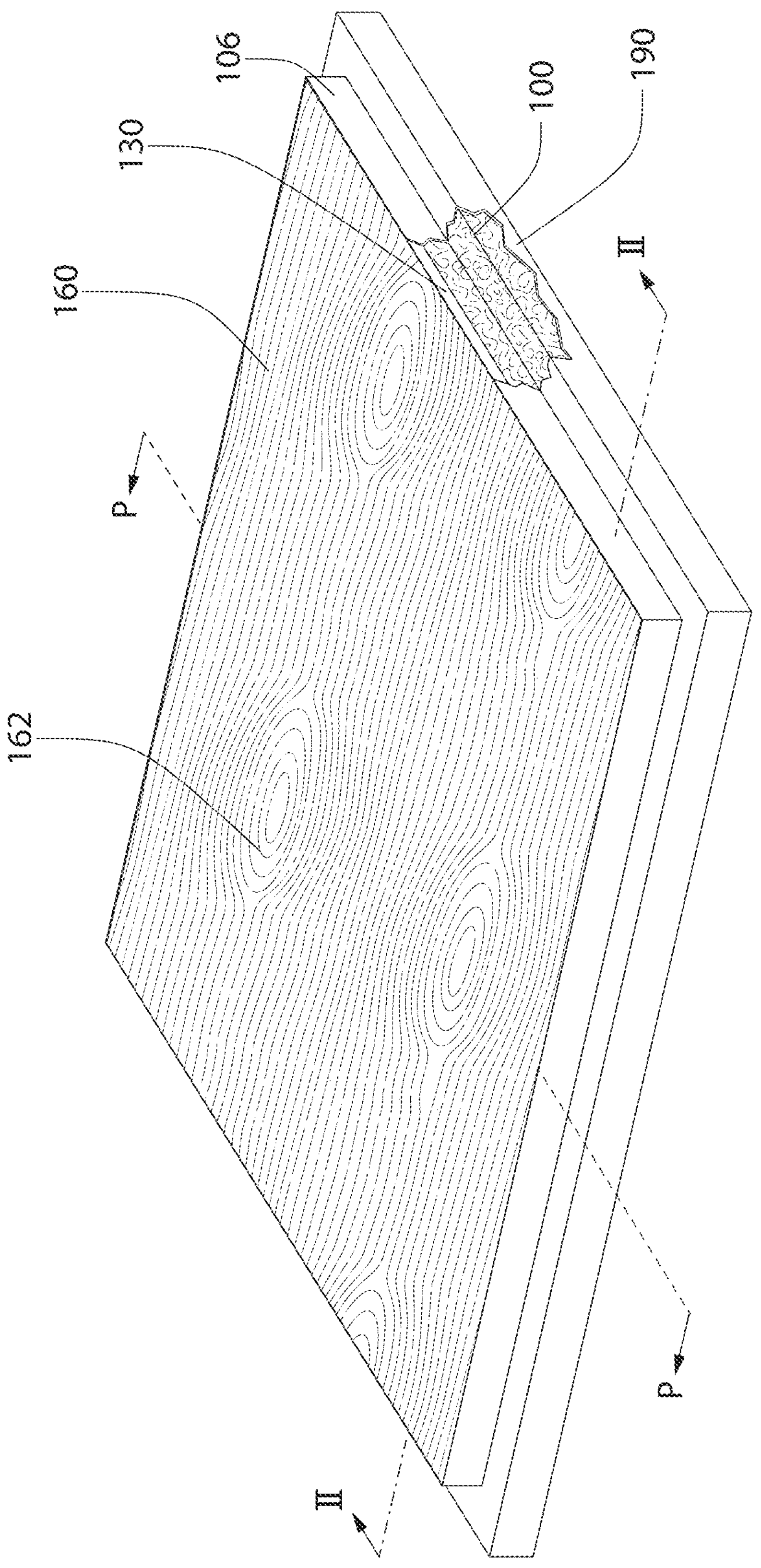
FIG. 1 is a top perspective view showing a panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 2:
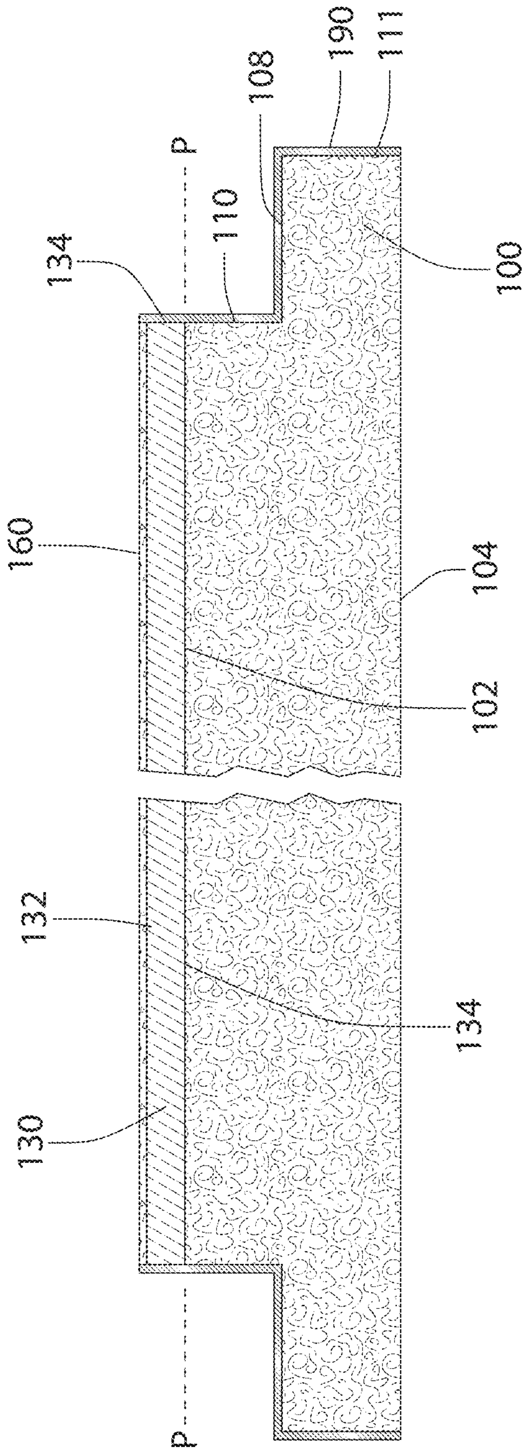
FIG. 2 is a cross-section view of the panel taken along line II-II of FIG. 1.

Referring to FIGS. 1 and 2, the present invention is directed to a panel 10. The panel 10 may be an acoustic panel designed to absorb or attenuate noise within a building. The panel 10 has a panel body 100, a scrim 130, a printed layer 160, and a coating 190. The panel body 100 may be an acoustic panel body designed to absorb or attenuate noise. The panel body 100 is preferably a rigid acoustic panel body.

The panel body 100 has a first major surface 102, a second major surface 104 opposite the first major surface 102, and an edge portion 106. The first major surface 102 of the panel body 100 may be substantially planar, or it may have a texture or pattern imprinted into the first major surface 102. Regardless of whether the first major surface 102 has a texture, pattern, or planar surface, a panel plane P-P extends along the first major surface 102 of the panel body 100.

The edge portion 106 extends from the first major surface 102 to the second major surface 104. The edge portion 106 includes the edges of the panel 10. Optionally, the edge portion 106 may comprise a stepped surface 108. The edge portion 106 may extend beyond the first major surface 102 in a direction parallel to the panel plane P-P. The stepped surface 108 may be parallel to the panel plane P-P and the first major surface 102 while being spaced from the panel plane P-P and the first major surface 102. Thus, the stepped surface 108 may be recessed from the first major surface 102 and the perimeter plane P-P. The perimeter surface 106 may also incorporate first and second peripheral surfaces 110, 111. The first peripheral surface 110 extends from the first major surface 102 to the stepped surface 108. The second peripheral surface 111 extends from the stepped surface 108 to the second major surface 104. The stepped surface 108 is also spaced from the second major surface 104. Thus, the first and second peripheral surfaces 110, 111 and the stepped surface 108 are all part of the edge portion 106 of the panel body 100. The first and second peripheral surfaces 110, 111 may extend perpendicular to the panel plane P-P or may be angled with respect to the panel plane P-P at some angle other than 90 degrees. However, the first and second peripheral surfaces 110, 111 extend at a non-zero angle with respect to the panel plane P-P. Optionally, the stepped surface 108 may be at an angle to the panel plane P-P, but this angle is preferably substantially less than 90 degrees. The edge portion 106 may be defined as all of the panel body 100 which extends beyond the first major surface 102 with respect to the panel plane P-P, regardless of the exact angle that the surfaces extend with respect to the panel plane P-P. The edge portion 106 is a non-planar profile extending from the first major surface 102 to the second major surface 104. The edge portion may be a tegular edge profile or a concealed edge profile.

In an alternate embodiment, the edge portion 106 may omit the stepped surface 108, comprising one or more peripheral surfaces without a stepped surface 108 that is recessed with respect to the first major surface 102 and the panel plane P-P. This includes embodiments where the edge portion 106 comprises plain edges which extend from the first major surface 102 to the second major surface 104, either perpendicular to the panel plane P-P or at an angle to the panel plane P-P other than 90 degrees.

The panel body 100 may be formed of a non-woven or woven material. The material of the panel body 100 may be a mineral wool, glass fiber, foam, acoustic fabric, wood, metal, or other natural or synthetic materials. Depending on the specific application of the resulting panel 10, the panel body 100 may be optimized for sound absorption or other characteristics. Thus, the panel 10 may be an acoustic panel for use in a building.

For example, the panel body 100 may be formed from an inorganic fiber. Some embodiments provide that the fiber may be selected from mineral wool, slag wool, rock wool, fiberglass, and a combination of two or more thereof. In some embodiments, the panel body 100 may be formed from an organic fiber, such as cellulosic fibers selected from wood fibers, paper fibers, or cotton linters. In some embodiments, the inorganic fiber and/or the organic fiber may come from a recycled source.

In some embodiments, a fibrous filler may be utilized to form the panel body 100. The amount of the fibrous filler used is at least about 65 wt. % based on the dry solids weight of the substrate, but can also vary from about 65 wt. % to about 90% wt. % by weight based on the dry solids weight of the panel body 100. In some embodiments, the fiber length may range from about 1 mm to about 4 mm.

In some embodiments, the panel body 100 may include non-fibrous fillers, such as kaolin clay, calcium carbonate, limestone, silica, vermiculite, ball clay or bentonite, talc, mica, gypsum, perlite, titanium dioxide, sand, barium sulfate, dolomite, polymers, wollastonite, calcite, aluminum trihydrate, pigments, zinc oxide, and zinc sulfate. In some embodiments the panel body 100 may include from about 0 wt. % to about 25 wt. % of the non-fibrous filler. In another embodiment, the panel body 100 may comprise expanded perlite in an amount ranging from about 0.1 wt. % to about 50 wt. % based on the weight of the panel body 100.

In some embodiments, the panel body 100 may comprise a binder. Some embodiments provide that the binder may be selected from granular starches, polymers, and a combination thereof. In some embodiments the panel body 100 may include between about 1 wt. % to about 35 wt. % of binder. In some embodiments the panel body 100 may include between about 3 wt. % to about 10 wt. % of binder. In some embodiments the panel body 100 may include between about 4 wt. % to about 6 wt. % of binder.

The granular starches may include pearl cornstarch, wheat starch, and potato starch. In some embodiments, the polymers may be produced from one or more of the following monomers vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methylacrylate, styrene, butadiene, epoxy, melamine. In some embodiments, the polymers may include polyurethanes, polyesters, polyethers, polystyrene, natural and modified natural polymers, polyvinyl chloride, polyvinyl alcohol, polyvinyl acetate, polymethyl methacrylate, and other acrylate or vinyl polymers. In some embodiments, the polyurethanes are derived from a di or poly-functional isocyanate compound and a di or poly-functional hydroxyl-compound. In some embodiments, the polyesters are derived from a di or poly-functional hydroxyl compound and a di or poly-functional carboxylic acid compound or anhydride compound.

In some embodiments, the panel body 100 may further include additional additives such as dispersants, flocculants, defoaming agents, fungicides, biocides, and a combination thereof.

In some embodiments, the panel body 100 may be formed via a conventional wet-felting process and then sanded to have a thickness in the range of about one-half inch to about 1 inch. Specifically, in some embodiments, the panel body 100 may be prepared by mixing together the aforementioned ingredients with an amount of water necessary to provide slurry consistency in conventional mixing and holding equipment. In some embodiments, the ingredients may be mixed together using a high-shear mixer. High mixing speeds may be used to create the high-shear conditions that degrade non-woven fabric to a large degree by separation of the individual fibers. In other embodiments, the high shear mixing degrades mineral wool by breaking it down into shorter fibers even when no or few nodules are present, resulting in a smooth surface being formed.

In some embodiments, the panel body 100 may be prepared by air-lay or direct-lay or other methods known in the art for preparing substrates as described herein.

The scrim 130 may be selected to be substantially sound-transparent to allow sound to pass through the scrim 130 for absorption in the panel body 100. The scrim 130 may also be selected to have a variety of other properties including oil resistance, water repellency, or other properties desirable in building materials. The scrim 130 is preferably a flexible sheet material.

The scrim 130 may be a fabric material that may be woven or non-woven. The scrim 130 may also be referred to as a veil. The scrim 130 may optionally fine or coarse, and generally has a mesh-like texture. The scrim 130 may be used for reinforcement in building materials, and it may be substantially acoustically transparent. The scrim 130 may be formed of a variety of materials, including glass fibers, mineral fibers, or natural fibers such as cotton. Fibers are generally bonded via an adhesive such as polyvinyl alcohol. The scrim 130 may be a filled scrim, which means that the scrim 130 has a greater density of fibers or it may be filled with a mineral material to reduce the size of the apertures.

In one implementation, the scrim 130 is a non-woven scrim comprising glass fibers, a binder, and a filler. The filler may range from about from about 20 wt. % to about 60 wt. % glass fibers. The filler may range from about 40 wt. % to about 80 wt. % of a mineral material. The filler may be applied to the glass fibers by applying a filler composition with a mass of about 155 wet g/m$^2$ to about 200 wet g/m$^2$ of the filler composition. The filler composition may be dried after application to achieve about 110 dry g/m$^2$ to about 135 dry g/m$^2$ of the filler.

In some embodiments, the scrim 130 may having a thickness ranging from about 0.2 mm to about 0.5 mm; alternatively a thickness of about 0.4 mm. In some embodiments, the scrim 130 has a basis weight of from about 100 g/m$^2$ to about 150 g/m$^2$; alternatively the scrim 130 has a basis weight of about 125 g/m$^2$.

In some embodiments the fibers may include glass fibers, wood fibers, and a combination thereof. In some embodiments, the fibers may have an aspect ratio from about 10:1 to about 1:10. In some embodiments the fibers may include glass fibers, wood fibers, and a combination thereof. In some embodiments, the fibers may have an aspect ratio from about 5:1 to about 1:5. In some embodiments the fibers may include glass fibers, wood fibers, and a combination thereof. In some embodiments, the fibers may have an aspect ratio from about 4:1 to about 1:2. In some embodiments, the fibers may be 3-9 mm in length.

In some embodiments the binder comprises an ingredient selected from polyvinyl alcohol, starch, a cellulosic resin, a polyamide, a polyacrylamide, a polyester, a polyolefin, a water soluble vegetable gum, urea-formaldehyde, melamine-formaldehyde, a melamine-phenol-formaldehyde copolymer, an acrylic copolymer, and a combination of two or more thereof. In some embodiments, the polyolefins include polypropylene and polyethylene.

In some embodiments, the scrim 130 comprises a filler selected from: calcium carbonate, aluminum trihydrate (ATH), magnesium hydroxide, dolomite, dolomitic limestone, and combinations thereof. In another embodiment, the filler may also include nitrogen-phosphorous based flame retardants, such as intumescent nitrogen-phosphorous compounds, organic nitrogen-phosphorous compounds, inorganic nitrogen-phosphorous compounds, melamine based products such as melamine-formaldehyde, melamine-polyphosphate, melamine cyanurate, melamine-phosphate, melamine-phenol-formaldehyde copolymers, acrylic copolymers, and bromine and chlorine halogenated fillers and/or resins optionally combined with antimony trioxide or antimony pentoxide synergists.

In some embodiments, the scrim 130 may further comprise a thickener or a whitener. Some embodiments provide that the thickener prevents particle settling and provides resistance to shear or elongation rate striation markings that may arise under processing conditions. According to one embodiment, thickeners may be present in an amount of about 0.1 wt. % to about 5 wt. % based on the solid binder content. In some embodiment, thickener may include a polyurethane copolymer, hydroxyethyl cellulose, a polyacrylamide, or a pH dependent thickeners, such as polyacrylates.

In some embodiments, the filler will be substantially spherical and range in size from about 0.1 to about 600 microns. In some embodiments, the filler will range in size from about 1 micron to about 500 microns. In some embodiments, the filler will range in size from about 10 microns to about 400 microns. In some embodiments, the filler will range in size from about 50 microns to about 300 microns. In some embodiments, the filler will range in size from about 200 microns to about 450 microns. In some embodiments, the filler comprises from about 35% to about 90% by weight of the filler composition on a dry solids basis.

According to one embodiment of the present invention, the filler occupies volume in the scrim that would be otherwise occupied by fiber or binder. According to another embodiment of the present invention, the filler enlarges voids already present between the fiber and/or binder in the scrim 130. In some embodiments, the presence of filler may allow for more air to flow through the scrim 130 when compared to a scrim that contains less filler (but more fiber and/or binder) than the scrim of the present invention. Thus, in some embodiments, the addition of filler throughout the scrim 130 facilitates airflow through the resulting panel 10. In some embodiments, the addition of filler to the scrim 130 creates a greater number of air-passageways through the scrim 130 and/or enlarges the air-passageways that would otherwise be present without the addition of filler. In some embodiments, the increased airflow through the scrim 130 enhances the acoustical performance.

In some embodiments, the scrim 130 may be formed by mixing together binder and filler with a liquid carrier-such as hot water-followed by the addition of dispersed fibers and other additional ingredients-such as an anionic polyacrylamide, dispersant, defoamer, and biocide.

In some embodiments the binder may be present in an amount ranging from about 0.1 wt. % to about 30 wt. % based on the weight of the scrim 130. In some embodiments the binder may be present in an amount ranging from about 1 wt. % to about 20 wt. % based on the weight of the scrim 130. In some embodiments the binder may be present in an amount ranging from about 5 wt. % to about 15 wt. % based on the weight of the scrim 130.

In some embodiments the fiber may be present in an amount ranging from about 20 wt. % to about 60 wt. % based on the weight of the scrim 130. In some embodiments the fiber may be present in an amount ranging from about 25 wt. % to about 50 wt. % based on the weight of the scrim 130.

In some embodiments the filler may be present in an amount ranging from about 40 wt. % to about 80 wt. % based on the weight of the scrim 130. In some embodiments the filler may be present in an amount ranging from about 50 wt. % to about 75 wt. % based on the weight of the scrim 130. In some embodiments, the filler is present in the amount of about 70 wt. % of the scrim 130.

The scrim 130 is applied to the first major surface 102 of the panel body 100 as illustrated. The scrim 130 may also comprise a first major surface 132 and a second major surface 134. The second major surface 134 of the scrim 130 is coupled to the first major surface 102 of the panel body 100. The scrim 130 may be coupled to the panel body 100 via an adhesive, a bonding or melting process, or any other known process. In some embodiments the adhesive may be a pressure sensitive adhesive, a hot melt adhesive, or a combination thereof. In some embodiments, the adhesive comprises a hot melt adhesive. In some embodiments, the adhesive comprises a pressure sensitive adhesive. In some embodiments, the adhesive comprises polyvinyl acetate. In some embodiments, the adhesive comprises ethylene vinylacetate (EVA).

The printed layer 160 is located on the first major surface 132 of the scrim 130. The printed layer 160 is used to form an image 162. Optionally, the image 162 may be a pattern, a picture, or any other type of image. The image 162 may be multi-colored, formed of several different colors of ink or other coloring agent. Optionally, the printed layer 160 may be formed on the scrim 130 as illustrated. In other configurations, the printed layer 160 may be both on the scrim 130 and intermingled with the scrim 130. For instance, the inks may be at least partially absorbed by the scrim 130 by entering pores of the scrim 130. Thus, the printed layer 160 penetrates into the scrim 130. This may beneficially coat and conceal the scrim 130 and further protect it from damage from weather, chemicals, and other effects. The printed layer 160 may be designed to protect the scrim 130 from reactions with fumes or atmospheric contaminants. This beneficially provides longer shelf life, longer functional life, and greater resistance to color change over the life of the panel 10. Preferably, the printed layer 160 covers an entirety of the first major surface 132 of the scrim 130, ensuring that the scrim 130 is completely obscured from view.

Total ink application volumes of 0.07 to 1.514 mL per sq. ft. are preferable to achieve a desirable combination of durability, coverage, and image quality. In some implementations, cyan, magenta, yellow, and black inks may be used. The cyan ink application volume may be 7.5% to 27.6% of the total volume. The magenta ink application volume may be 28.8% to 34.3% of the total volume. The yellow ink application volume may be 33.6% to 54.2% of the total volume. The black ink application volume may be 0% to 14.8% of the total volume.

The image 162 on the printed layer 160 may mimic a natural or artificial surface such as concrete, stone, wood, or may be used to give the impression of a painted wall, painted wood, or other common materials. Preferably, the image 162 is a wood grain pattern designed to mimic the appearance of natural wood. Alternately, the image 162 may be any multicolored image the user desired. In some implementations, the user may request custom images to form various patterns or textures. Different, but similar, images 162 may be used across a plurality of panels 10 to provide a more natural aesthetic appearance, improving the simulation of a concrete, stone, or wood wall, ceiling, or other surface. Preferably, the image 162 is one of a wood-grain pattern, a concrete pattern, or a stone pattern.

The coating 190 covers an entirety the edge portion 106 but does not cover the first major surface 102 or the second major surface 104 of the panel body 100 or the first major surface 132 of the scrim 130. Although the coating 190 may cover a perimeter 134 of the scrim 130, it is only intended to cover the scrim 130 and the edge portion 106 of the panel body 100. The coating 190 may terminate either at the printed layer 160 or slightly overlap it, but is preferably applied such that it does not interfere with the image 162. Preferably, the coating 190 is color matched to a major color of the image 162. Thus, the coating 190 may have the same color as one of the colors of the image 162. Preferably, the coating 190 has a color which is the same as the majority color of the image 162. This ensures an effective blending between the image 162 and the coating 190, rendering the coating 190 less obvious and ensuring a desirable aesthetic appearance.

The coating composition 191 used to form the coating 190 may be a liquid-based coating composition. The coating composition 191 may comprise a binder, a particulate, and a liquid carrier. Non-limiting examples of particulate include pigment, filler, and combinations thereof. Non-limiting examples of binder include polymeric binder. The liquid carrier may comprise water. The coating composition 191 may have a high-solids content—the term "high solids content" refers to a liquid based coating composition 191 having a solids content of at least 60 wt. % based on the total weight of the coating composition. The coating composition 191 may also be referred to as a "high solids paint." The coating composition 191 may have a solids content ranging from about 65 wt. % to about 90 wt. % based on the total weight of the coating composition 191—including all percentages and sub-ranges there-between. The resulting coating 190, after drying of the coating composition 191, may also be a high solids paint.

Figure 3:
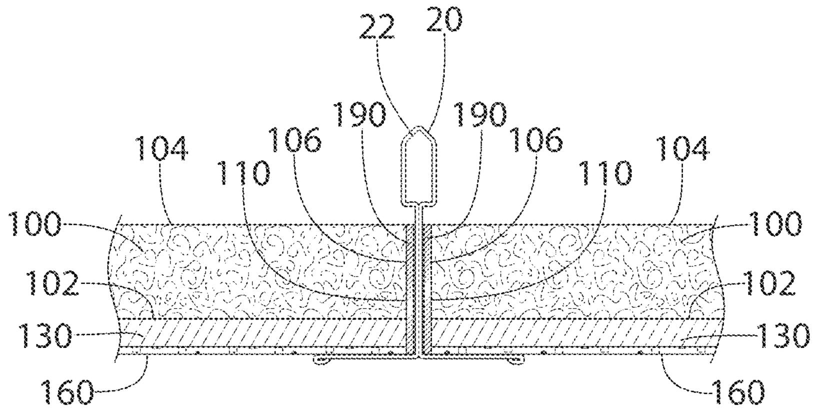
FIG. 3 is a schematic cross-section view of two square lay-in panels installed on a support grid.
Figure 4:
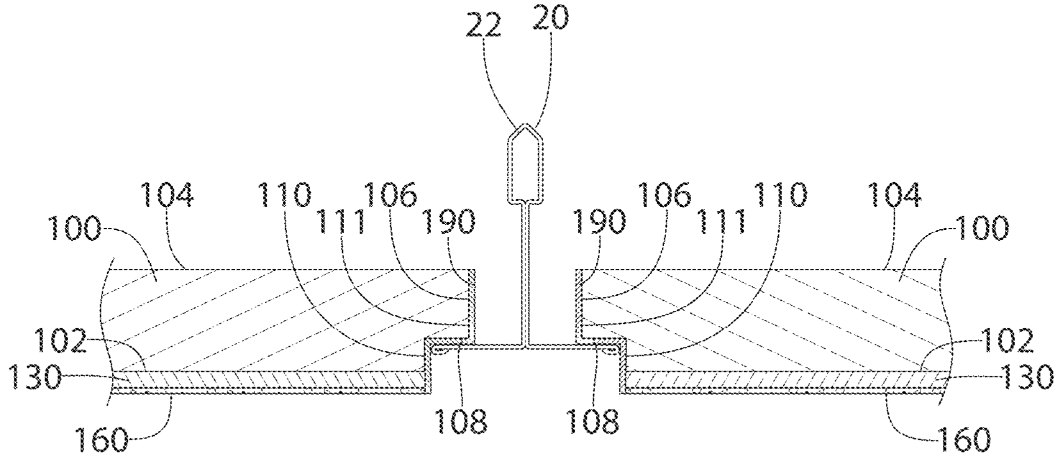
FIG. 4 is a schematic cross-section view of two tegular panels installed on a support grid.
Figure 5:
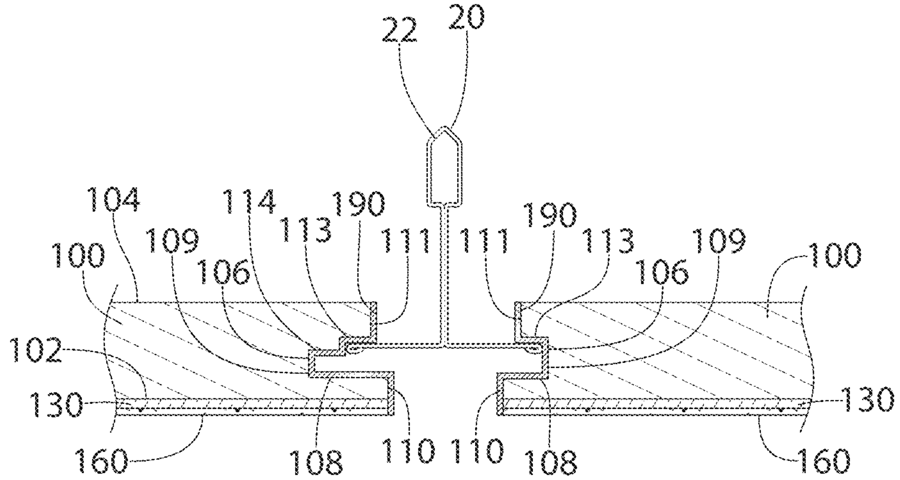
FIG. 5 is a schematic cross-section view of two vector panels installed on a support grid.

FIGS. 3 to 5 illustrate a variety of different types of panels 10 installed on a grid support member 22 of an overhead support grid 20. Each of the panels 10 shown in FIGS. 3 to 5 utilize the same reference numbering as the panel 10 discussed above, except as noted. In the embodiment of FIG. 3, a pair of panels 10 are illustrated in an installed stated, whereby the panels 10 are supported by a grid support member 22 of the overhead support grid 20. As discussed above, the panel 10 has a panel body 100 covered by a scrim 130. A printed layer 160 is applied to the scrim 130 and a coating 190 covers an edge portion 106 of the panel 10. The panel 10 has a square edge, such that the edge portion 106 of the panel body 100 has a single peripheral surface 110 extending from a first major surface 102 to a second major surface 104 of the panel body 100. The coating 190 covers the edge portion 106 of the panel body 100 as well as perimeters of the scrim 130 and the printed layer 160. The major surface 102, covered by the scrim 130 and the printed layer 160, rests on the grid support member 22.

In FIG. 4, a pair of panels 10 are illustrated in an installed stated, whereby the panels 10 are supported by a grid support member 22 of the overhead support grid 20. As discussed above, the panel 10 has a panel body 100 covered by a scrim 130. A printed layer 160 is applied to the scrim 130 and a coating 190 covers an edge portion 106 of the panel 10. The panel 10 has a tegular edge, such that the edge portion 106 of the panel body 100 has a first peripheral surface 110 extending from a first major surface 102 to a stepped surface 108. The stepped surface 108 is substantially parallel to the first major surface 102. A second peripheral surface 111 extends from the stepped surface 108 to the second major surface 104 of the panel body 100. The coating 190 covers the edge portion 106 of the panel body 100 as well as perimeters of the scrim 130 and the printed layer 160. The stepped surface 108, covered by the coating 190, rests on the grid support member 22. As illustrated, the tegular edge is a non-planar profile having a plurality of surfaces which are not all coincident, but instead at angles to one another. Thus, at least one step is formed on the edge portion 106.

In FIG. 5, a pair of panels 10 are illustrated in an installed stated, whereby the panels 10 are supported by a grid support member 22 of the overhead support grid 20. As discussed above, the panel 10 has a panel body 100 covered by a scrim 130. A printed layer 160 is applied to the scrim 130 and a coating 190 covers an edge portion 106 of the panel 10. The panel 10 has a vector edge.

The vector edge of the panel 10 includes a series of surfaces which allow the grid support member 22 to engage the edge portion 106 of the panel 10. On a first edge of the panel 10, the edge portion 106 of the panel body 100 has a first peripheral surface 110 extending from a first major surface 102 to a stepped surface 108. A recessed surface 109 extends from the stepped surface 108 to a second stepped surface 113. The stepped surface 108, second stepped surface 113, and the first major surface 102 are substantially parallel. A second peripheral surface 111 extends from the second stepped surface 113 to the second major surface 104. The second peripheral surface 111 and the first peripheral surface 110 may not be coincident, but may be substantially parallel.

On a second edge of the panel 10, the edge portion of the panel body 100 has a first peripheral surface 110 extending from a first major surface 102 to a stepped surface 108. A recessed surface 109 extends from the stepped surface 108 to a third stepped surface 112. A third peripheral surface 114 extends from the third stepped surface 112 to a second stepped surface 113. A second peripheral surface 111 extends from the second stepped surface to the second major surface 104. The stepped surface 108, second stepped surface 113, third stepped surface 112, and the first major surface 102 are substantially parallel. The first peripheral surface 110, second peripheral surface 111, and the third peripheral surface 114 may not be coincident, but may be substantially parallel. The coating 190 covers the edge portion 106 of the panel body 100 as well as perimeters of the scrim 130 and the printed layer 160. The second stepped surfaces 113, covered by the coating 190, rest on the grid support member 22. Similarly, the vector edge is a non-planar profile having a plurality of surfaces which are not all coincident, but instead at angles to one another. Thus, at least one step is formed on the edge portion 106.

Figure 6:
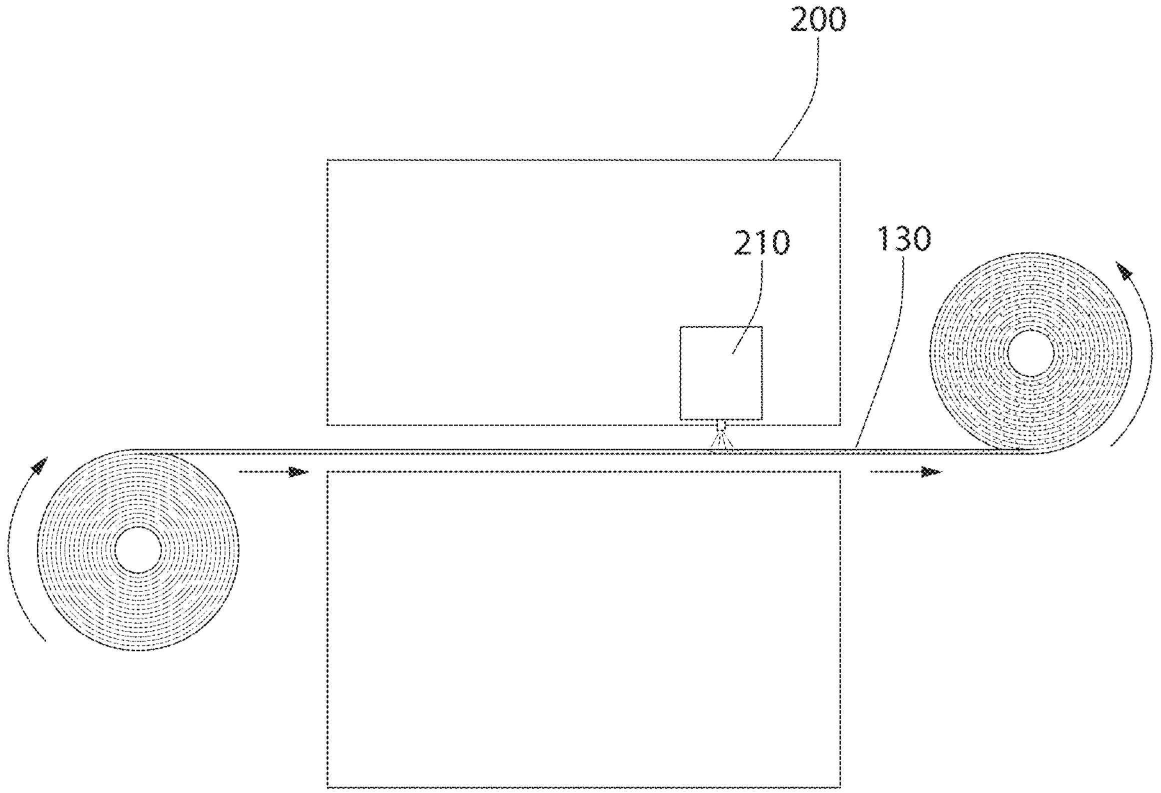
FIG. 6 is a schematic view of printer applying a printed layer to a scrim which may be used to manufacture the panel of FIG. 1.
Figure 7:
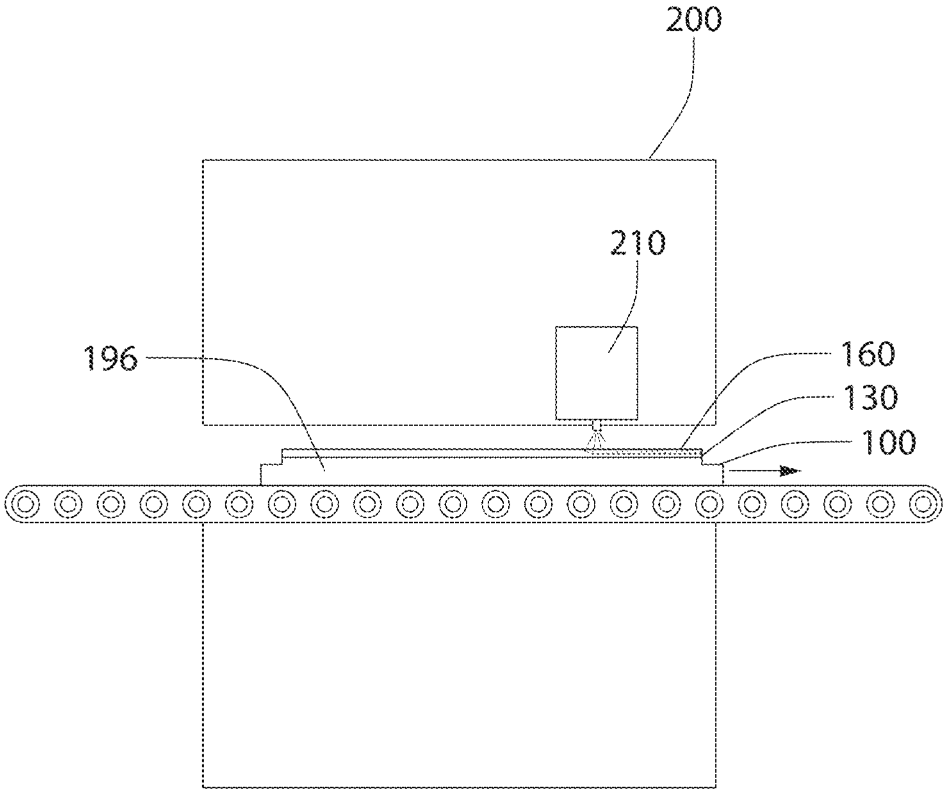
FIG. 7 is schematic view of printer applying a printed layer to a scrim and a panel body which may be used to manufacture the panel of FIG. 1.

Turning to FIGS. 6 and 7, two different ways of applying the printed layer 160 to the scrim 130 are illustrated. In FIG. 6, the printed layer 160 is printed onto the scrim 130 using a printer 200. The printer 200 may be a screen printer, lithography printer, dye-sublimation printer, offset printer, inkjet printer, rotogravure printer, relief printer, intaglio printer, thermographic printer, hot stamping printer, block printer, reactive dye printer, heat transfer printer, or any other known type. However, preferably, the printer 200 is an inkjet printer. The printer 200 has a print head 210 configured to apply inks of a plurality of colors.

The printer 200 preferably dispenses liquid inks onto the scrim 130 to form the image 162 and apply the printed layer 160. The printer 200 may operate by applying multiple colors of ink directly to the scrim 130 to form the printed layer 160. The printer 200 may print on a roll of scrim comprising a plurality of scrims 130 for a plurality of panels 10 or may print individual scrims 130 one at a time. The scrims 130 are subsequently joined to the panel bodies 100 after applying the printed layer 160 to the scrim 130. The scrims 130 are preferably printed by roll feeding the scrim 130 through the printer 200 from a feed roller to an output roller and continuously printing the image 162 on the first major surface 132 of the scrim 130 as the scrim 130 passes through the printer 200.

In an alternate approach shown in FIG. 7, the print head 210 of the printer 200 applies the printed layer 160 to the scrim 130 and the panel body 100 subsequent to joining of the scrim 130 to the panel body 100. In this method, the scrim 130 is joined to the panel body 100 to form a panel subassembly 196. The printed layer 160 is then applied to the panel subassembly 196. In alternate configurations described above, the printed layer 160 is applied to the scrim 130 before the panel subassembly 196 is formed by joining the scrim 130 to the panel body 100. Thus, the panel subassembly 196 may or may not include the printed layer 160.

Figure 8:
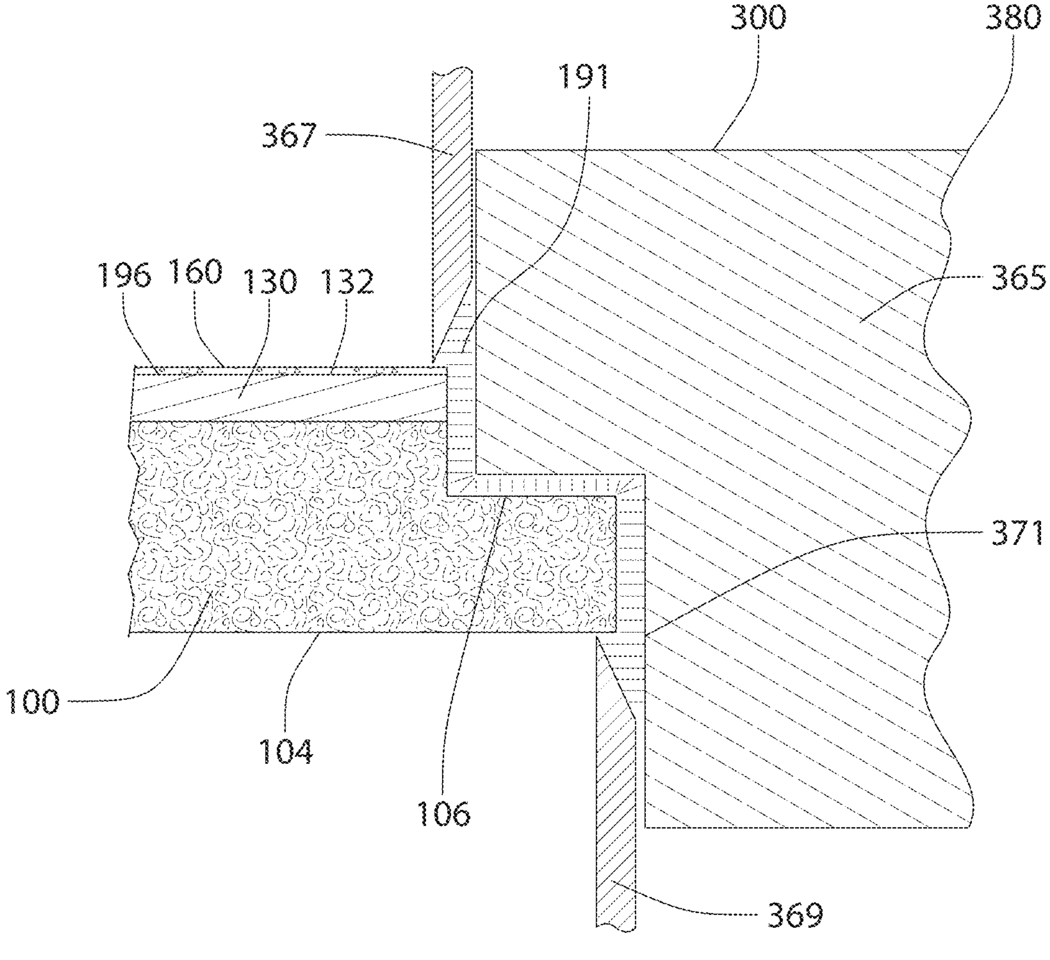
FIG. 8 is schematic view of printer applying a printed layer to a scrim and a panel body which may be used to manufacture the panel of FIG. 1.

In FIG. 8, an edge coating machine 300 is illustrated coating a panel subassembly 196. The edge coating machine 300 is illustrated adjacent an edge portion 106 of the panel subassembly 196. The panel subassembly 196 has a scrim 130, panel body 100, and printed layer 160. The edge coating machine 300 applies a coating composition 191. As discussed above, the coating composition 191 may be a high solids paint. The edge coating machine 300 is configured to receive one side of the edge portion 106 of the panel 10 at a time, the panel 10 passing by the edge coating machine 300 to coat the entire side of the edge portion 106 in a single pass. The edge coating machine has an applicator manifold 365 and upper and lower face plates 367, 369 which extend adjacent the leading edge 371 of the applicator manifold 365. The applicator manifold 365 and upper and lower face plates 367, 369 collectively form an applicator head 380.

The applicator head 380 dispenses the coating composition 191 by spraying the coating composition 191 via the applicator manifold 365, while the upper and lower face plates 367, 369 prevent deposition of composition on the printed layer 160, the first major surface 132 of the scrim 130, or the second major surface 104 of the panel body 100. The applicator manifold 365 further incorporates apertures to vacuum excess coating composition 191 during spraying. Thus, the applicator manifold 365 sprays pressurized coating composition 191 onto the edge portion 106 of the panel body 100 and optionally also onto the edges of the scrim 130 and the printed layer 160. Vacuum is used to remove excess coating composition 191, improve the surface finish of the coating 190, and avoid overspray beyond the upper and lower face plates 367, 369. The vacuum aids in removal of the excess coating composition 191 and draws air past the upper and lower face plates 367, 369, preventing coating composition 191 from resting on the printed layer 160 and the second major surface 104.

In yet other configurations, the panel body 100 may be coated before the scrim 130 is joined to the panel body 100 if so desired. In yet other configurations, the panel assembly 196 may have the coating 190 applied prior to application of the printed layer 160 to the scrim 130. Thus, the coating 190 may be applied after joining the scrim 130 to the panel body 100.

In operation, the panel subassembly 196 is positioned such that a portion of the edge portion 106 of the panel subassembly 196 is adjacent to the applicator head 380 of the edge coating machine 300. The panel subassembly 196 is moved relative to the applicator head 380 and the coating composition 191 is sprayed onto the portion of the edge portion 106 of the panel subassembly 106 via the applicator head 380. The applicator head 380 may apply the coating composition 191 via pressurized spray with an atomizing chamber or other means of atomizing the coating composition 191 to facilitate application. This process may be repeated until an entirety of the edges of the edge portion 106 are coated with the coating composition 191. Subsequently, the coating composition 191 is dried to form the coating 190. U.S. Pat. No. 9,266,141 is hereby incorporated by reference. This document describes exemplary edge coating processes and equipment.

The coating 190 conceals the edge portion 106 of the panel body 100. Preferably, the coating 190 is color matched with one or more colors of the image 162 of the printed layer 160. The image 162 is composed of multiple colors. The image 162 has a first spectral power distribution. The coating 190 is a singular color and has a second spectral power distribution. The first spectral power distribution may be defined as the combination of wavelengths emitted and reflected by the image 162 when viewed in fluorescent, incandescent, or LED visible or infrared light. The second spectral power distribution may be defined as the combination of wavelengths emitted and reflected by the coating 190 when viewed in fluorescent, incandescent, or LED visible or infrared light. The first and second spectral power distributions are preferably different.

However, the image 162 and the coating 190 are a metameric match for one another under at least one of a fluorescent light source, an incandescent light source, or an LED light source. The term metameric match is defined as two colors which appear identical to the eye but are composed of different combinations of wavelengths of light. Thus, the image 162 and the coating 190 have different combinations of wavelengths of light but appear to be the same color. Stated differently, the spectral power distributions, or spectral distributions, of reflected and emitted light when viewed in light from a variety of visible or infrared light sources, results in the same visual appearance of the colors of the image 162 and the coating 190.

Figure 9:
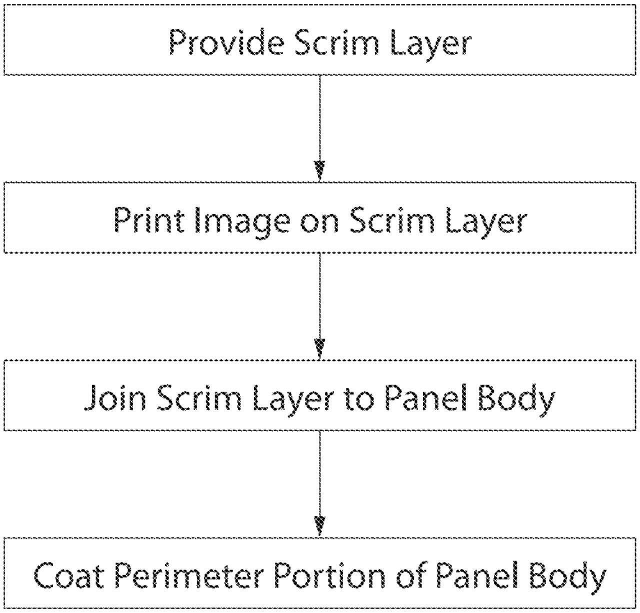
FIG. 9 is a flow chart illustrating a method of manufacturing the panel of FIG. 1.

FIG. 9 illustrates a method of manufacturing a panel 10. In a first step, a scrim 130 is provided. The scrim 130 is a scrim material as discussed above. The scrim 130 subsequently has a printed layer 160 having an image 162 printed onto the scrim 130. The printed layer 160 is formed of a plurality of different colored ink from a printer such as the printer 200 illustrated above. The image 162 may be a graphic, a pattern, or a picture having a plurality of colors. Preferably, the printed layer 160 is formed by an inkjet printer in an inkjet printing process. The entirety of the scrim 130 is preferably covered by the printed layer 160.

After the printed layer 160 is applied to the scrim 130, the scrim 130 is joined to a panel body 100. The panel body 100, as discussed above, forms the bulk of the panel 10 and may be formed of an acoustic-absorbent material. The joining of the scrim 130 to the panel body 100 forms a panel subassembly 196. The joining of the scrim 130 to the panel body 100 may be performed using an adhesive such as a glue. In other configurations, the printed layer 160 may be applied to the scrim 130 subsequent to joining of the scrim 130 to the panel body 100.

In a final step, a coating 190 is applied to an edge portion 106 of the panel body 100 to complete the panel 10. Optionally, the coating 190 may be applied to the edge portion 106 of the panel body 100 prior to printing of the printed layer 160 on the scrim 130 or prior to joining of the scrim 130 to the panel body 100 as desired in a particular process.

The image 162 may be prepared in an image editing process having the following steps. First, an image of a wood grain pattern is selected from a plurality of images of a wood grain pattern. Second, any knots in the wood grain pattern are removed to create a modified wood grain image. Finally, the modified wood grain image is printed on the scrim 130. Thus, the image 162 may be a modified wood grain image which has been edited to remove knots from the wood grain pattern.

EXEMPLARY CLAIM SET

Exemplary claim 1. A method of manufacturing a panel comprising: a) printing a wood-grain image on a first major surface of a scrim with a printer, the scrim comprising a second major surface opposite the first major surface of the scrim; b) attaching the second major surface of the scrim to a first major surface of a panel body to form a panel subassembly, the panel body comprising a second major surface opposite the first major surface of the panel body and an edge portion extending between the first and second major surface of the panel body, the edge portion comprises a non-planar profile; c) applying a coating composition onto the edge portion of the panel body to form a coating on the edge portion.

Exemplary claim 2. The method according to exemplary claim 1 wherein step a) occurs prior to step b).

Exemplary claim 3. The method according to exemplary claim 1 or exemplary claim 2 wherein step b) occurs prior to step c).

Exemplary claim 4. The method according to any one of exemplary claims 1 to 3 wherein step a) further comprises: a-1) roll feeding the scrim through the printer from a feed roller to an output roller; and a-2) continuously printing the wood-grain image on the first major surface of the scrim as the scrim passes through the printer.

Exemplary claim 5. The method according to any one of exemplary claims 1 to 4 wherein the printing of step a) comprises applying an ink to the scrim to form a printed layer on the first major surface of the scrim.

Exemplary claim 6. The method according to any one of exemplary claims 1 to 5 wherein the printing of step a) comprises applying a plurality of different colored inks to the first major surface of the scrim to form the wood-grain image.

Exemplary claim 7. The method according to any one of exemplary claims 1 to 6 wherein the printer is an inkjet printer and the printing of step a) is an inkjet printing process.

Exemplary claim 8. The method according to any one of exemplary claims 1 to 7 wherein step c) comprises spraying the coating composition onto the edge portion of the panel body and applying a vacuum to the edge portion of the panel body to remove excess amounts of the coating composition.

Exemplary claim 9. The method according to any one of exemplary claims 1 to 8 wherein the scrim is a non-woven scrim.

Exemplary claim 10. The method according to any one of exemplary claims 1 to 9 wherein the scrim is a filled scrim.

Exemplary claim 11. The method according to any one of exemplary claims 1 to 10 wherein the scrim is a flexible sheet and the panel body is a rigid acoustic panel body.

Exemplary claim 12. The method according to any one of exemplary claims 1 to 11 wherein the coating composition comprises a high solids paint.

Exemplary claim 13. The method according to any one of exemplary claims 1 to 12 wherein step c) further comprises: c-1) positioning the panel subassembly so that a portion of the edge portion of the panel body is adjacent to an applicator head of an edge coating machine; c-2) creating relative movement between the panel subassembly and the applicator head; and c-3) concurrently spraying the coating composition onto the portion of the edge portion of the panel body and applying a vacuum to the edge portion of the panel body to remove excess amounts of the coating composition via the applicator head during step c-2).

Exemplary claim 14. The panel according to any one of exemplary claims 1 to 13 wherein the printing of step a) comprises forming a printed layer on the first major surface of the scrim that comprises the wood-grain image and conceals the first major surface of the scrim; and wherein the coating applied in step c) conceals the edge portion of the panel body.

Exemplary claim 15. The panel according to any one of exemplary claims 1 to 14 wherein the print layer penetrates into the scrim.

Exemplary claim 16. The panel according to any one of exemplary claims 1 to 15 wherein the edge portion of the panel body comprises at least one step.

Exemplary claim 17. The panel according to claim 16 wherein the edge portion comprises at least one of a tegular edge profile or a concealed edge profile.

Exemplary claim 18. The panel according to any one of exemplary claims 1 to 17 wherein the wood-grain image comprises a plurality of colors and has a first spectral power distribution and the coating is a singular color and has a second spectral power distribution that is different than the first spectral power distribution.

Exemplary claim 19. The panel according exemplary claim 18 wherein the wood-grain image and coating are a metameric match for one another under at least one of a fluorescent light source or an incandescent light source.

Exemplary claim 20. A panel comprising: an acoustic panel body comprising a first major surface, a second major surface opposite the first major surface, and an edge portion extending between the first and second major surfaces, the edge portion comprising a non-planar profile; a filled scrim comprising a first major surface and a second major surface opposite the first major surface of the scrim, the second major surface of the filled scrim coupled to the first major surface of the acoustic panel body; a printed layer on the first major surface of the filled scrim, the printed layer comprising a wood-grain image; and a high solids paint coating on the edge portion of the acoustic panel body.

Exemplary claim 21. The panel according to exemplary claim 20 wherein the filled scrim is a non-woven scrim.

Exemplary claim 22. The panel according to exemplary claim 20 or exemplary claim 21 wherein the filled scrim is a non-woven scrim wherein the filled scrim comprises a fibrous body and a filler material dispersed within the fibrous body.

Exemplary claim 23. The panel according to any one of exemplary claims 20 to 22 wherein the wood-grain image is formed by a plurality of colors and the high-solids paint coating is formed by a singular color.

Exemplary claim 24. The panel according to any one of exemplary claims 20 to 23 wherein the printed layer has a first spectral power distribution and the high-solids paint has a second spectral power distribution that is different than the first spectral power distribution.

Exemplary claim 25. The panel according to any one of exemplary claims 20 to 24 wherein the printed layer and the high-solids paint coating are a metameric match for one another under at least one of a fluorescent light source or an incandescent light source.

Exemplary claim 26. The panel according to any one of exemplary claims 20 to 25 wherein the edge portion comprises at least one step.

Exemplary claim 27. The panel according to any one of exemplary claims 20 to 26 wherein the high-solids paint coating conceals the edge portion of the acoustic panel body.

Exemplary claim 28. The panel according to any one of exemplary claims 20 to 27 wherein the acoustic panel body is a mineral fiber body or a fiberglass body.

Exemplary claim 29. The panel according to any one of exemplary claims 20 to 28 wherein the printed layer conceals the first major surface of the filled scrim.

Exemplary claim 30. The panel according to any one of exemplary claims 20 to 29 wherein the printed layer penetrates into pores of the filled scrim.

Exemplary claim 31. The panel according to any one of exemplary claims 20 to 30 wherein the panel is a ceiling panel.

Exemplary claim 32. A building panel comprising: a panel body comprising a first major surface, a second major surface opposite the first major surface, and an edge portion extending between the first and second major surfaces; a filled scrim comprising a first major surface and a second major surface opposite the first major surface of the filled scrim, the second major surface of the filled scrim coupled to the first major surface of the acoustic panel body; and a printed layer on the first major surface of the filled scrim, the printed layer comprising a wood-grain image.

What is claimed is:

1. A panel comprising:

an acoustic panel body comprising a first major surface, a second major surface opposite the first major surface, and an edge portion extending between the first and second major surfaces, the edge portion comprising a non-planar profile;

a filled scrim comprising a first major surface and a second major surface opposite the first major surface of the scrim, the second major surface of the filled scrim coupled to the first major surface of the acoustic panel body;

a printed layer on the first major surface of the filled scrim, the printed layer defining an image or pattern that penetrates into pores of the filled scrim and conceals the first major surface of the filled scrim; and a high solids paint coating on the edge portion of the acoustic panel body.

2. The panel according to claim 1 wherein the printed layer is formed by a plurality of colors and the high-solids paint coating is formed by a singular color.

3. The panel according to claim 1 wherein the printed layer has a first spectral power distribution and the high-solids paint has a second spectral power distribution that is different than the first spectral power distribution.

4. The panel according to claim 1 wherein the printed layer and the high-solids paint coating are a metameric match for one another under at least one of a fluorescent light source or an incandescent light source.

5. The panel according to claim 1 wherein the printed layer conceals the first major surface of the filled scrim.

6. The panel according to claim 1 wherein the printed layer penetrates into pores of the filled scrim.

7. The building panel according to claim 1, wherein the printed layer defines a wood grain image, concrete image, or stone image.

8. The panel according to claim 1, wherein the printed layer defines a texture.

9. The panel according to claim 1, wherein the scrim is filled with a filler comprising a mineral material.

10. The panel according to claim 1, wherein the scrim comprises:

glass gibers;

a filler comprising mineral material; and a binder comprising polyvinyl alcohol.

11. The panel according to claim 1, wherein the panel body comprises fiber selected from mineral wool, slag wool, rock wool, fiberglass, and a combination of two or more thereof.

12. A building panel comprising:

a panel body comprising a first major surface, a second major surface opposite the first major surface, and an edge portion extending between the first and second major surfaces;

a filled scrim comprising a first major surface and a second major surface opposite the first major surface of the filled scrim, the second major surface of the filled scrim coupled to the first major surface of the acoustic panel body; and a printed layer on the first major surface of the filled scrim, the printed layer defining an image or pattern that penetrates into pores of the filled scrim and conceals the first major surface of the filled scrim.

13. The building panel according to claim 12, wherein the printed layer defines a wood grain image, concrete image, or stone image.

14. The panel according to claim 12, wherein the printed layer is formed by a plurality of colors.

15. The panel according to claim 12, further comprising a high-solids paint coating on the edge portion of the panel body that is color-matched to a predominant color of the printed layer such that the printed layer and the high-solids paint coating are a metameric match under at least one of a fluorescent or incandescent light source.

16. The panel according to claim 15, wherein the high-solids paint coating is color-matched to a predominant color of the printed layer such that the printed layer and the high-solids paint coating are a metameric match under at least one of a fluorescent or incandescent light source.

17. The panel according to claim 12, wherein the scrim is filled with a filler comprising a mineral material.

18. The panel according to claim 12, wherein the scrim comprises:

glass gibers;

a filler comprising mineral material; and a binder comprising polyvinyl alcohol.

19. The panel according to claim 12, wherein the printed layer covers an entirety of the first major surface of the scrim.

20. The panel according to claim 12, wherein the printed layer defines a texture.

* * * * *